US010065862B2

(12) United States Patent
Jeong et al.

(10) Patent No.: US 10,065,862 B2
(45) Date of Patent: Sep. 4, 2018

(54) METHOD FOR PREPARING CARBON NANOTUBE FIBER REINFORCED WITH CARBON PRECURSOR

(71) Applicant: Soongsil University Research Consortium Techno-Park, Seoul (KR)

(72) Inventors: Young Jin Jeong, Seoul (KR); Jun Young Song, Gyeonggi-Do (KR); Dong Hwan Cho, Gyeongsangbuk-Do (KR); Byung Kuk Kim, Daegu (KR)

(73) Assignee: Soongsil University Research Consortium TechnoPark, Seoul (KR)

( * ) Notice: Subject to any disclaimer, the term of this patent is extended or adjusted under 35 U.S.C. 154(b) by 558 days.

(21) Appl. No.: 14/390,463

(22) PCT Filed: Apr. 11, 2013

(86) PCT No.: PCT/KR2013/003050
§ 371 (c)(1),
(2) Date: Oct. 3, 2014

(87) PCT Pub. No.: WO2013/180383
PCT Pub. Date: Dec. 5, 2013

(65) Prior Publication Data
US 2015/0069666 A1    Mar. 12, 2015

(30) Foreign Application Priority Data

May 30, 2012    (KR) .................. 10-2012-0057375

(51) Int. Cl.
*C01B 32/164*    (2017.01)
*D01F 1/10*    (2006.01)
(Continued)

(52) U.S. Cl.
CPC ............ *C01B 32/164* (2017.08); *C01B 32/16* (2017.08); *C01B 32/168* (2017.08);
(Continued)

(58) Field of Classification Search
None
See application file for complete search history.

(56) References Cited

U.S. PATENT DOCUMENTS 5,698,175 A  * 12/1997 Hiura .................... B82Y 30/00
                                                    423/445 B
2006/0057290 A1* 3/2006 Glatkowski ............ B82Y 10/00
                                                    427/256
(Continued)

FOREIGN PATENT DOCUMENTS

CN          102181964 A    9/2011
JP          2010-065339 A  3/2010
(Continued)

OTHER PUBLICATIONS

Li, Yang, Hui-cai Wang, and Mu-jie Yang. "N-Type Gas Sensing Characteristics of Chemically Modified Multi-Walled Carbon Nanotubes and PMMA Composite." Sensors & Actuators: B. Chemical 121.(2007): 496-500. ScienceDirect. Web. Feb. 2, 2017.*
(Continued)

*Primary Examiner* — Matthew J Daniels
*Assistant Examiner* — Manley L Cummins, IV
(74) *Attorney, Agent, or Firm* — Christensen, Fonder, Dardi & Herbert PLLC; Curtis Herbert

(57) ABSTRACT

The present invention relates to carbon nanotube fibers reinforced with a carbon precursor and a method for manufacturing the same. The carbon nanotube fibers reinforced with a carbon precursor according to the present invention are carbonized by the empty space inside the carbon nanotube fibers being filled with a carbon precursor, and therefore, are highly effective in that the mechanical and thermal properties are improved due to effective stress transfer and contact resistance decrease, and these properties are maintained intact even at high temperatures.

12 Claims, 3 Drawing Sheets

(51) Int. Cl.
- *D01F 9/14* (2006.01)
- *D01D 10/00* (2006.01)
- *D01F 11/10* (2006.01)
- *C01B 32/16* (2017.01)
- *C01B 32/168* (2017.01)
- *C01B 32/174* (2017.01)
- *B82Y 40/00* (2011.01)

(52) U.S. Cl.
CPC ........... *C01B 32/174* (2017.08); *D01D 10/00* (2013.01); *D01F 1/10* (2013.01); *D01F 9/14* (2013.01); *D01F 11/10* (2013.01); *B82Y 40/00* (2013.01)

(56) References Cited

U.S. PATENT DOCUMENTS

| | | | |
|---|---|---|---|
| 2008/0170982 A1* | 7/2008 | Zhang | B82Y 10/00 423/447.3 |
| 2008/0181839 A1 | 7/2008 | Arendt et al. | |
| 2009/0060815 A1* | 3/2009 | Wong | B82Y 30/00 423/324 |
| 2010/0028639 A1* | 2/2010 | Liang | B82Y 30/00 428/220 |
| 2010/0112322 A1* | 5/2010 | Kumar | B82Y 30/00 428/220 |
| 2010/0324315 A1* | 12/2010 | Atyabi | A61K 9/0092 549/510 |
| 2011/0280793 A1 | 11/2011 | Keller et al. | |

FOREIGN PATENT DOCUMENTS

| | | |
|---|---|---|
| JP | 2010-530929 A | 9/2010 |
| WO | 2008112349 A2 | 9/2008 |

OTHER PUBLICATIONS

X100 SIGMA-ALDRICH Triton™ X-100 <http://www.sigmaaldrich.com/catalog/product/sial/x100?lang=en&region=US> (retrieved Oct. 31, 2017). (Year: 2017).*
International Search Report with translation from application No. PCT/KR2013/003050 dated Jun. 21, 2013 (4 pages).
Dalton, et al., "Super-tough carbon-nanotube fibres", Nature, (2003), vol. 423, p. 703.
Chae et al., "Stabilization and carbonization of gel spun 1-13 polyacrylonitrile/single wall carbon nanotube composite fibers", Polymer, (2007), vol. 48, pp. 3781-3789.
Chae et al., "Carbon Nanotube Reinforced Small Diameter Polyacrylonitrile Based Carbon Fiber", Composites Science and Technology, 69:406-413 (2009).
Ci et al., "Continuous Carbon Nanotube Reinforced Composites", Nano Letters, 8(9):2762-2766. (2008).
Fraczek et al., "Effect of Dispersion of Carbon Nanotubes in Polyacrylonitrile Matrix on Mechanical and Thermal Behavior of Nanocomposites", Journal of Physics: 146:1-6 (2009).
Pirlot et al., "Preparation and Characterization of Carbon Nanotube/Polyacrylonitrile Composites", Advanced Engineering Materials, 4(03)C183:595-602 (2002).
Pirlot et al., "Surface Modifications of Carbon Nanotube/Polyacrylonitrile Composite Films by Proton Beams", Chemical Physics Letters 372:595-602 (2003).
Sreekumar et al., "Polyacrylonitrile Single-Walled Carbon Nanotube Composite Fibers", Advanced Material, 16(1) 1-4 (Jan. 5, 2004).

* cited by examiner

PURE CARBON
NANOTUBE FIBERS

FIBERS COATED AND
CARBONIZED WITH PAN 3wt%

METHOD FOR PREPARING CARBON NANOTUBE FIBER REINFORCED WITH CARBON PRECURSOR

CROSS REFERENCE TO RELATED APPLICATIONS

This application is a national stage filing of PCT Application PCT/KR2013/003050 filed Apr. 11, 2013, which claims prior to Korean Patent Application No. 10-2012-0057375 filed May 30, 2012, all of which applications are hereby incorporated by reference herein.

TECHNICAL FIELD

The present invention relates to a method for manufacturing carbon nanotube fibers reinforced with a carbon precursor.

BACKGROUND ART

Since being first invented by Dr. Ijima of NEC Corporation in 1991, carbon nanotubes have aroused significant interests in the scientific and industrial circles as one of the most interesting new materials. Particularly, polymer/carbon nanotube nano-composite materials have outstanding mechanical, chemical, thermal, electrical and optical properties compared to existing materials, and the development of these ideal materials have received worldwide attention. Polymer/carbon nanotube nano-composite materials are composite materials much stronger than existing materials, and are considered to have various potential engineering applications including applications in various cutting edge IT industries.

Carbon nanotubes are carbon materials having a high aspect ratio with typical diameters of 1 to 100 nanometers (nm) and lengths of a few nanometers (nm) to tens of micrometers (μm). Carbon nanotubes have a tubular form with honeycomb-shaped planar carbon structures, which are formed with 1 carbon atom bonding to 3 different carbon atoms, being rolled up. There are various types of carbon nanotubes, and depending on the number of walls forming a nanotube, carbon nanotubes may be divided into multi-walled nanotubes (MWNT) and single-walled nanotubes (SWNT). When carbon nanotubes are formed with two or more walls, they are called as multi-walled nanotubes, and when carbon nanotubes are formed with only one wall, they are called as single-walled nanotubes.

INTRODUCTION AND SUMMARY

Carbon nanotube fibers are an assembly of carbon nanotubes, and have a considerable empty space inside, and accordingly, there are problems in that electrical conductivity, thermal conductivity and mechanical properties may not be maximally exhibited.

In existing technologies, in order to overcome such problems of carbon nanotube fibers, research results of coating carbon nanotubes fibers with polyvinyl alcohol (PVA) to improve the surface wear resistance of the carbon nanotubes fibers were published, and a team of Professor Ajayan in the Rice University in the US reported in Nano Lett. Journal (vol. 8(9), pp 2762-2766, 2008) that mechanical performances are improved when a polydimethylsiloxane polymer is immersed in carbon nanotube fibers to make composite materials.

However, preparing carbon fibers by carbonizing carbon nanotubes have not been reported, and researches on this area have also not been made.

In view of the above, the inventors of the present invention have continuously carried out researches for improving the properties of carbon fibers, and formed composite fibers by coating carbon nanotube fibers with a carbon precursor, and prepared composite fibers in which empty space inside the carbon nanotube fibers is filled with carbon by stabilizing and carbonizing the result, and the inventors have completed the present invention by identifying that tensile modulus, tensile strength and thermal stability of the carbon nanotube fibers prepared as above are improved.

An object of the present invention is to provide a method for manufacturing carbon nanotube fibers reinforced with a carbon precursor.

The present invention provides a method for manufacturing carbon nanotube fibers reinforced with a carbon precursor.

Carbon nanotube fibers reinforced with a carbon precursor according to the present invention are carbonized by the empty space inside the carbon nanotube fibers being filled with a carbon precursor, and therefore, are highly effective in that the mechanical and thermal properties are improved due to effective stress transfer and contact resistance decrease, and these properties are maintained intact even at high temperatures.

SUMMARY OF THE INVENTION

Figure 1:
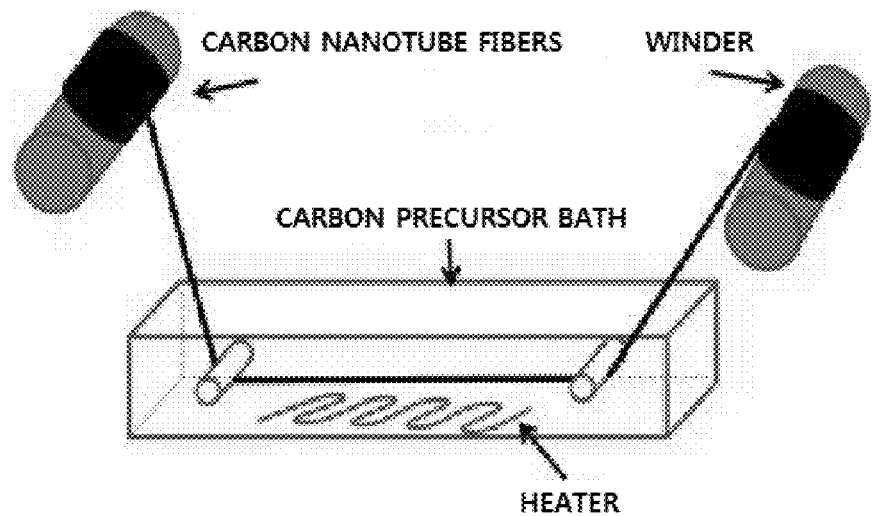
FIG. 1 is a diagram briefly showing a process for manufacturing carbon nanotube fibers reinforced with a carbon precursor according to the present invention.

The present invention provides a method for manufacturing carbon nanotube fibers including (a) preparing carbon nanotube fibers coated with the carbon precursor by dissolving a carbon precursor in a solvent and immersing carbon nanotubes therein; (b) drying the carbon nanotube fibers coated with the carbon precursor in the step (a); (c) stabilizing the carbon nanotube fibers dried in the step (b) through heat treatment at 100 to 400° C. under air atmosphere; and (d) carbonizing the carbon nanotube fibers stabilized in the step (c) through heat treatment at 500 to 1600° C. for 30 minutes to 1 hour under inert gas atmosphere.

Hereinafter, the present invention will be described in detail step by step.

The step (a) is a step of preparing carbon nanotube fibers coated with a carbon precursor, wherein a carbon precursor is dissolved in a solvent, and functionalized carbon nanotube fibers or carbon nanotube fibers are coated by being immersed therein.

The carbon precursor is a reinforced material, and, while not being limited thereto, may include polyacrylonitrile, polyvinyl alcohol, cellulose, pitch and the like.

The solvent, while not being limited thereto, may include dimethylsulfoxide, dimethylformamide, dimethylamylamine, water, a mixed liquid of N-methylmorpholine N-oxide and water, a mixed liquid of lithium chloride and dimethylacetamide, a mixed liquid of sodium hydroxidue (NaOH) and urea, quinoline, toluene and the like.

In order for the carbon nanotube fibers to infiltrate into the carbon precursor, a step of surface treating the carbon nanotube fibers using acid treatments, ultraviolet irradiation, plasma treatments, electron beam treatments, surfactants, solvents or the like may be further included as necessary.

The acid treatment, while not being limited thereto, may be carried out by immersing the carbon nanotube fibers for a certain period of time in an acidic solution having a concentration of 4 to 15 moles at a temperature of 30 to 100° C., and carbon nanotube fibers of which surfaces are functionalized may be prepared through the acid treatment process.

The ultraviolet irradiation, while not being limited thereto, may be carried out by irradiating ultraviolet light in a wavelength of 100 to 400 nm for 10 to 120 minutes, and carbon nanotube fibers of which properties are not declined may be prepared through the ultraviolet irradiation process.

The plasma treatment, while not being limited thereto, may be carried out by treating the carbon nanotube fibers with oxygen plasma for 5 to 120 minutes, and carbon nanotube fibers of which surfaces are functionalized may be prepared through the plasma treatment.

The functionalization using the solvent, while not being limited thereto, may be carried out through the process of immersing the carbon nanotube fibers in 10% by weight of an aqueous $NH_2OH.HCl$ solution, and herein, $NH_3OH^+$ that is present in a dissociated state in the aqueous solution is an acidic ion, and is strongly bonded to a surface with high electron density such as the carbon nanotube surface, and diffuses and infiltrates into between the carbon nanotube bundles, and therefore, the carbon nanotube fibers may be charged with cations.

The functionalization using the surfactant, while not being limited thereto, may be carried out by immersing the carbon nanotube fibers in a solution of sodium dodecyl sulfate, triton X-100, lithium dodecyl sulfate, gum arabic, sodium lignosulfonate, polystyrene sulfonate and the like, and polarity may be applied to the carbon nanotube surface through the surfactant treatment.

The step (b) is a step of drying the carbon nanotube fibers coated in the step (a), and the drying step, while not being limited thereto, may be carried out by drying the carbon nanotube fibers in an oven at 50 to 70° C. for 20 to 30 hours, and preferably, drying is carried out at 60° C. for 24 hours.

The step (c) is a step of stabilization, and the step of stabilizing the carbon nanotube fibers, while not being limited thereto, is preferably carried out through heat treatment at 100 to 400° C. for 20 minutes to 24 hours under air with the temperature being elevated for 0.5 to 1.5° C. per minute.

The step (d) is a step of carbonizing the carbon nanotube fibers, and heat treating the carbon nanotube fibers at 500 to 1600° C. for 30 minutes to 1 hour under inert gas atmosphere, and as the inert gas, nitrogen, argon or helium may be preferably used, while not being limited thereto.

After the step (d), a step of (e) graphitizing the carbonized carbon nanotube fibers through heat treatment at 1700 to 3000° C. for 30 minutes to 1 hour under inert gas atmosphere may be further included. As the inert gas, nitrogen, argon or helium may be preferably used, while not being limited thereto.

The carbon nanotube fibers reinforced with a carbon precursor manufactured using the method described above exhibit tensile modulus increase of approximately 7 to 10 times and tensile strength increase of approximately 3 to 5 times compared to pure carbon nanotube fibers, and have very improved thermal stability.

Accordingly, the carbon nanotube fibers according to the present invention are not particles but have a continuous fiber shape thereby have improved tensile modulus, tensile strength and thermal stability compared to pure carbon nanotube fibers, and are very flexible, therefore, may be manufactured as a three dimensional structure as well as being weaved and formed to fibers, and in addition to that, may be very readily manufactured as a two-dimensional or three-dimensional structure since elongation at break reaches approximately 20%.

Hereinafter, the present invention will be described in more detail with reference to examples. However, the following examples are for illustrative purposes only, and the scope of the present invention is not limited thereto.

<Example 1> Manufacture of Carbon Nanotube Fibers Reinforced with Polyacrylonitrile Hydrogen gas and a solution, in which 2.3% by weight of ferrocene as a catalyst and 1.5% by weight of thiophene as an activator are mixed with acetone, a source of carbon supply, and then dispersed using an ultrasonication device, are introduced together to a vertical electric furnace at a speed of 800 ml/minute. Herein, carbon nanotube fibers were synthesized with the temperature of the electric furnace set at 1100° C. The carbon nanotube fibers were wound at the bottom of the electric furnace, and a polyacrylonitrile solution was prepared by mixing a polyacrylonitrile (PAN) polymer to dimethyl sulfoxide (DMSO) to have a concentration of 3% by weight and heating the result for 3 hours at 90° C. After that, the carbon nanotube fibers were coated with the polyacrylonitrile solution having a concentration of 3% by weight, and the polyacrylonitrile solution-coated carbon nanotube fibers were dried in an oven at 60° C. for one day. Next, the polyacrylonitrile solution-coated carbon nanotube composite fibers were stabilized by oxidation at 300° C. for 1 hour with the temperature being elevated for 1° C. per minute, and carbonized at 1000° C. for 1 hour under nitrogen atmosphere, and as a result, carbon nanotube fibers reinforced with polyacrylonitrile were manufactured.

A manufacturing process, scanning electron microscopy photographs, physical properties (tensile modulus, tensile strength) and thermal stability of the carbon precursor-coated carbon nanotube fibers of the present invention are each shown in FIG. 1 to FIG. 5.

Figure 2:
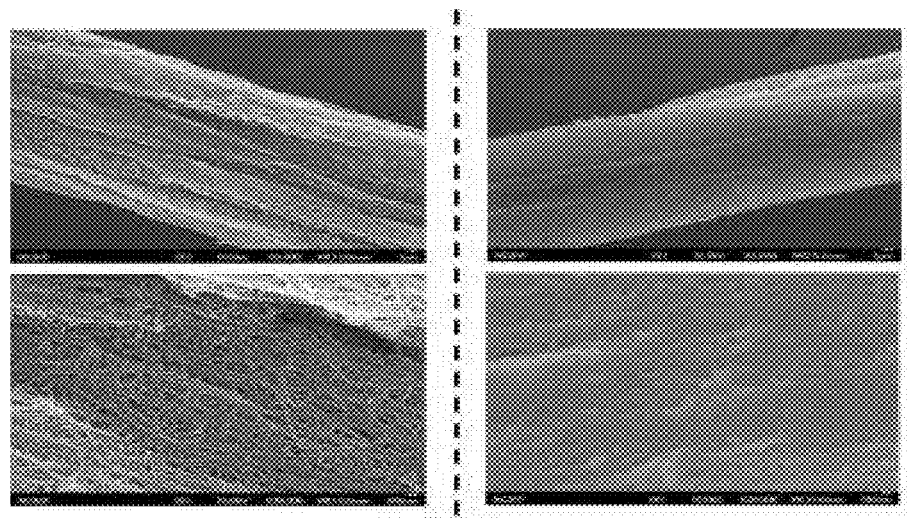
FIG. 2 are diagrams showing scanning electron microscopy photographs of pure carbon nanotube fibers (left) and carbon nanotube fibers coated with a carbon precursor of the present invention (right).

As shown in FIG. 2, it is verified that the carbon nanotube fibers according to the present invention have a smoother surface compared to pure carbon nanotubes.

Figure 3:
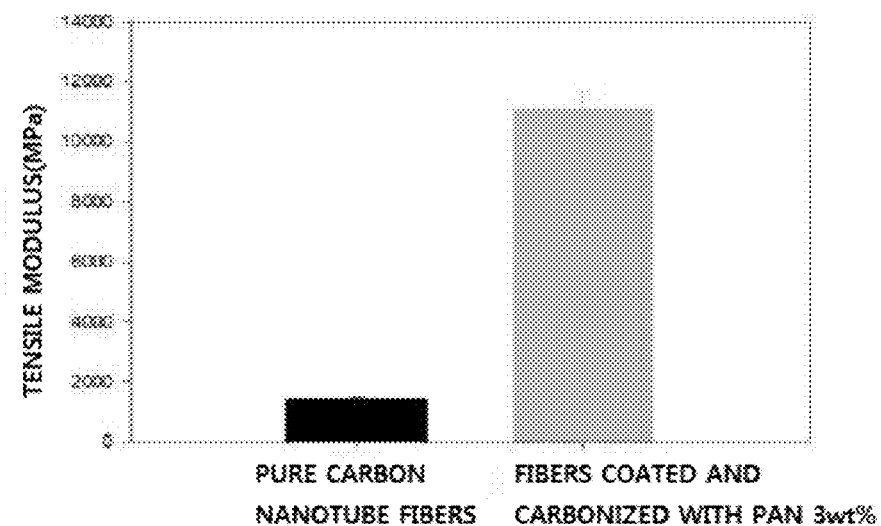
FIG. 3 is a diagram showing tensile modulus of pure carbon nanotube fibers and carbon nanotube fibers of the present invention.
Figure 4:
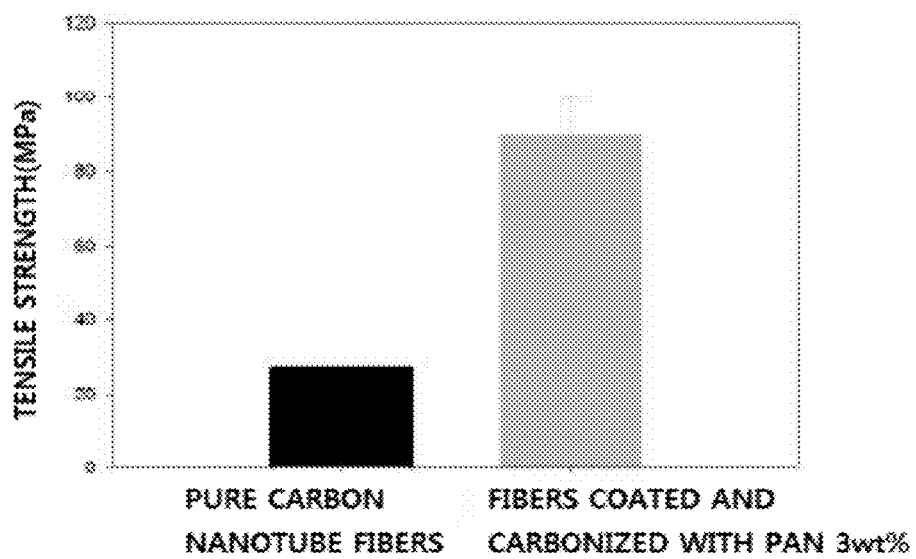
FIG. 4 is a diagram showing tensile strength of pure carbon nanotube fibers and carbon nanotube fibers of the present invention.
Figure 5:
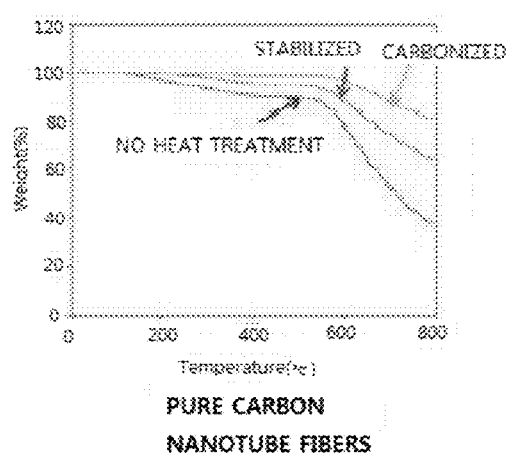
FIG. 5 is a diagram showing pyrolysis behaviors of pure carbon nanotube fibers and carbon nanotube fibers of the present invention.
Figure 5:
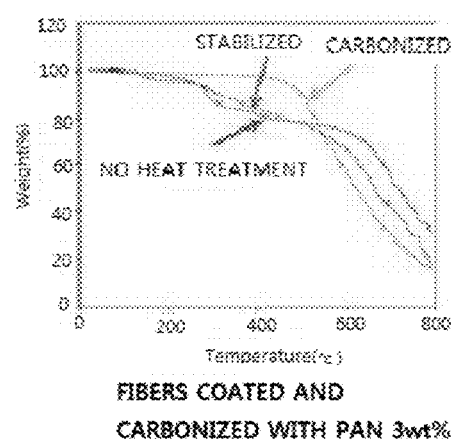

In addition, as shown in FIG. 3 to FIG. 5, it is verified that the carbon nanotube fibers according to the present invention have increased tensile modulus and tensile strength by approximately 8 times and 3.4 times, respectively, compared to pure carbon nanotube fibers, and also have improved thermal stability.

<Example 2> Manufacture of Carbon Nanotube Fibers Reinforced with Polyvinyl Alcohol An aqueous polyvinyl alcohol solution was prepared by mixing polyvinyl alcohol with water to have a concentration of 3% by weight, and heating the result for 4 hours at 90° C. The surfaces of carbon nanotube fibers were hydrophilized by being treated with oxygen plasma (flow rate; Ar-100 ml/m, $O_2$-1 sccm) for 30 minutes. After that, the functionalized carbon nanotube fibers were immersed in the aqueous polyvinyl alcohol solution prepared above, and then the result was dried in a dryer at 60° C. for one day. The polyvinyl alcohol-treated carbon nanotube fibers were placed in an iodine-included airtight container, and treated with iodine vapor for 12 hours at 80° C. Next, the iodide-treated carbon nanotube fibers were stabilized at 200° C. for 24 hours with the temperature being elevated for 1° C. per minute, and the stabilized carbon nanotube composite fibers were carbonized at 1200° C. for 30 minutes under argon atmosphere, and as a result, carbon nanotube fibers reinforced with polyvinyl alcohol were manufactured.

<Example 3> Manufacture of Carbon Nanotube Fibers Reinforced with Cellulose

After drying cellulose having a degree of polymerization of 210 in a dryer set at 60° C. for one day, the cellulose was mixed to a LiCl (8% by weight)/DMAc (dimethylacetamide) solution to have a concentration of 2% by weight at room temperature. After that, the cellulose was dissolved by stirring the cellulose mixed with the solvent for 2 hours at 60° C. Carbon nanotube fibers were functionalized by introducing the carbon nanotube fibers to a reactor filled with 5 moles of nitric acid, and stirring the result for 2 hours at 90° C. The carbon nanotube fibers of which the surfaces were treated with nitric acid were neutralized with distilled water, and were dried in an oven at 150° C. for 12 hours, and as a result, functionalized carbon nanotube fibers were prepared. The functionalized carbon nanotube fibers were immersed in the cellulose solution, and the cellulose was allowed to sufficiently infiltrate into the carbon nanotube fibers. The carbon nanotube fibers reinforced with cellulose were dried in an oven at 60° C. for one day, the dried fibers were stabilized for 20 minutes at 200° C. under air, and then the stabilized fibers were carbonized for 30 minutes at 1000° C. under nitrogen atmosphere, and as a result, carbon nanotube fibers reinforced with cellulose were manufactured.

<Example 4> Manufacture of Carbon Nanotube Fibers Reinforced with Pitch

Pitch was mixed with quinoline in 1% by weight, the result was heated for 2 hours at 60° C., and carbon nanotube fibers were immersed in the pitch solution to prepare pitch-coated carbon nanotube fibers. After that, the pitch-coated carbon nanotube composite fibers were dried in an oven for one day to remove quinoline, and the pitch-reinforced carbon nanotube fibers were stabilized for 2 hours at 310° C. under air atmosphere with the temperature being elevated for 1° C. per minute. Then, the stabilized carbon nanotube fibers were heat treated at 1100° C. for 1 hour under nitrogen atmosphere, and as a result, carbon nanotube composite fibers reinforced with pitch were manufactured.

The invention claimed is:

1. A method for manufacturing carbon nanotube yarn reinforced with carbon, the method comprising:
    (a) pretreating carbon nanotube yarn using any one step selected from: acid treatment; ultraviolet irradiation; plasma treatment; electron beam treatment; and immersion in a solvent or a surfactant;
    (b) immersing the carbon nanotube yarn pretreated in step (a) in a carbon precursor in a solvent, thereby obtaining carbon nanotube yarn coated with a carbon precursor;
    (c) drying the carbon nanotube yarn coated with the carbon precursor in step (b);
    (d) stabilizing the carbon nanotube yarn dried in step (c) through heat treatment at 100 to 400° C. under air atmosphere; and
    (e) carbonizing the carbon nanotube yarn stabilized in step (d) through heat treatment at 500 to 1600° C. for 30 minutes to 1 hour under inert gas atmosphere.

2. The method for manufacturing carbon nanotube yarn reinforced with carbon of claim 1, further comprising:
    (f) graphitizing the carbon nanotube yarn carbonized in step (e) through heat treatment at 1700 to 3000° C. for 30 minutes to 1 hour under inert gas atmosphere after the step (e).

3. The method for manufacturing carbon nanotube yarn reinforced with carbon of claim 1, wherein the acid treatment is carried out by immersing the carbon nanotube fibers in an acidic solution of 4 to 15 moles at 30 to 100° C.

4. The method for manufacturing carbon nanotube yarn reinforced with carbon of claim 1, wherein the ultraviolet irradiation is carried out by irradiating ultraviolet light in a wavelength of 100 to 400 nm for 10 to 120 minutes.

5. The method for manufacturing carbon nanotube yarn reinforced with carbon of claim 1, wherein the electron beam treatment is carried out with electron beam absorbed dose of 10 kGy to 500 kGy.

6. The method for manufacturing carbon nanotube yarn reinforced with carbon of claim 1, wherein the solvent is 5 to 15% by weight of an aqueous $NH_2OH \cdot HCl$ solution.

7. The method for manufacturing carbon nanotube yarn reinforced with carbon of claim 1, wherein the surfactant is one or more surfactants selected from the group consisting of sodium dodecyl sulfate, t-Oct-$C_6H_4$—$(OCH_2CH_2)_xOH$ wherein x=9-10, lithium dodecyl sulfate, gum arabic, sodium lignosulfonate and polystyrene sulfonate.

8. The method for manufacturing carbon nanotube yarn reinforced with carbon of claim 1, wherein, in step (b), the carbon precursor is one or more carbon precursor selected from the group consisting of polyacrylonitrile, polyvinyl alcohol, cellulose and pitch.

9. The method for manufacturing carbon nanotube yarn reinforced with carbon of claim 1, wherein the solvent in step (b) is one or more solvents selected from the group consisting of dimethylsulfoxide, dimethylformamide, dimethylamylamine, water, a mixture of N-methylmorpholine N-oxide and water, a mixture of lithium chloride and dimethylacetamide, a mixture of sodium hydroxide (NaOH) and urea, quinoline and toluene.

10. The method for manufacturing carbon nanotube yarn reinforced with carbon of claim 1, wherein the drying in step (c) is carried out at 50 to 70° C. for 20 to 30 hours.

11. The method for manufacturing carbon nanotube yarn reinforced with carbon of claim 1, wherein the heat treatment in step (d) is carried out for 20 minutes to 24 hours with the temperature being elevated for 0.5 to 1.5° C. per minute.

12. The method for manufacturing carbon nanotube yarn reinforced with carbon of claim 1, wherein the inert gas is nitrogen, argon or helium.

* * * * *